July 17, 1962 — W. M. THOMPSON — 3,044,584
HOLLOW CAP SCREW ASSEMBLY WITH DISPLACEABLE PLUG
Filed May 27, 1959
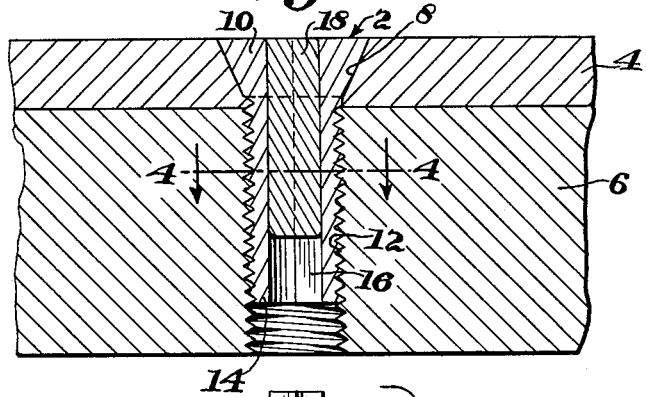
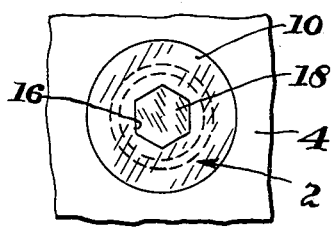
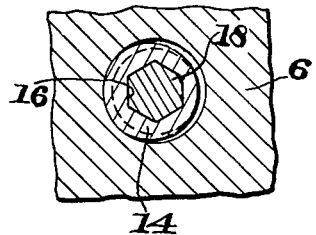
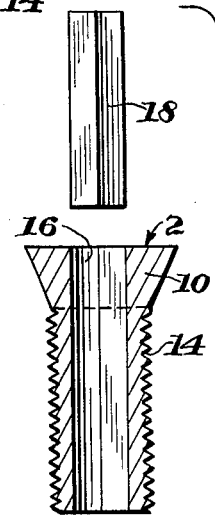
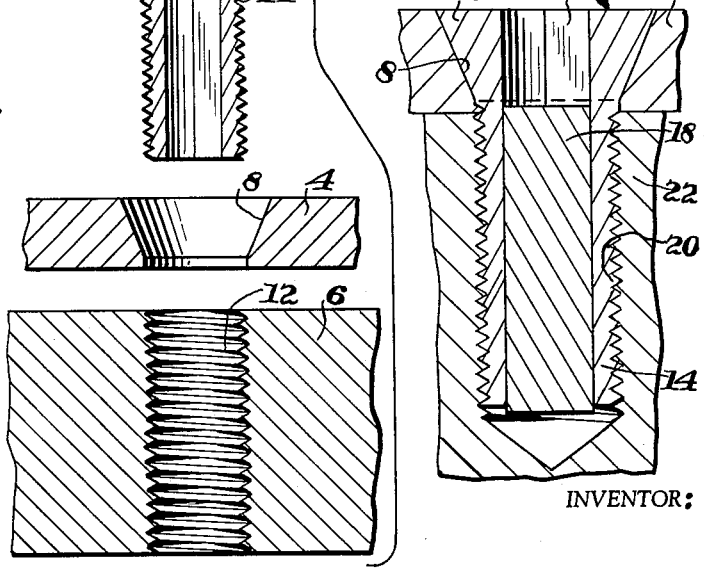
INVENTOR:
Wallace M. Thompson,
BY Cushman, Darby & Cushman
ATTORNEYS

United States Patent Office 3,044,584
Patented July 17, 1962

3,044,584
HOLLOW CAP SCREW ASSEMBLY WITH DISPLACEABLE PLUG
Wallace M. Thompson, Cordele, Ga., assignor to Harris Foundry & Machine Co., Cordele, Ga., a corporation of Georgia
Filed May 27, 1959, Ser. No. 816,102
3 Claims. (Cl. 189—36)

This invention relates to a cap screw assembly and, more particularly, to an assembly that is adapted for use under extreme conditions of wear.

In certain types of machinery, parts exposed to extreme wear are replaceable. In many instances such replaceable parts are secured in place by cap screws. If such screws break at any point along their length, however, an expensive drilling operation is necessary for replacement. Moreover, if the head of a conventional screw becomes worn away, an expensive drilling operation again usually is necessary for replacement.

The baling or compression chamber of a scrap metal baling press usually is provided with plate-like wear-resistant replaceable liners, usually secured in place by cap screws. Even though the head of such a screw is countersunk into a liner plate flush with its outer surface, when the press is used, metal of the screw head may actually be displaced into the wrench or screw-driver-engageable recess in such head, whether such recess be a kerf or a non-circular socket for engagement by a Phillips-type screw driver. Furthermore, such kerf or recess may become filled with debris. In either event, the use of a screw driver-type turning tool to unscrew the screw is practically impossible. Moreover, it will be seen that if such a screw breaks along its length a drilling operation will be necessary to remove the same.

It is, therefore, an object of this invention to provide an improved cap screw assembly which, when installed, has a flat-surfaced head uninterrupted by any wrench-engageable recesses or the like.

It is another object of this invention to provide an improved cap screw assembly which, when installed, has a head provided with a flat, uninterrupted surface, and yet which can be engaged readily at any point along its length by an appropriate turning tool, so that even should the screw be broken or its head worn away, the broken or remaining parts can be unscrewed readily from a threaded aperture.

Other objects and advantages of the invention will become apparent from the following description and accompanying drawings in which:

FIGURE 1 is a sectional view of a cap screw assembly embodying this invention, with the assembly shown securing a flat plate-like element to a back-up member.

FIGURE 2 is an exploded view of the parts shown in FIGURE 1.

FIGURE 3 is a top plan view of the assembly shown in FIGURE 1.

FIGURE 4 is a fragmentary sectional view taken substantially on line 4—4 of FIGURE 1.

FIGURE 5 is an enlarged fragmentary view corresponding to FIGURE 1, but illustrating a different back-up member and showing the parts in position for engagement by an appropriate turning tool.

Referring now to the drawings there is shown in FIGURE 1, a plate-like element 4, such as a liner for the baling chamber of scrap metal baling press. The plate-like element 4 is secured to a back-up member 6, such as the wall of a baling cahmber, by a cap screw assembly embodying this invention. The assembly includes a cap screw 2, the exterior of which is generally of conventional form having a flat frusto-conical head 10 engageable in a complementary counterbore 8 in the plate-like element 4, and a threaded shank 14 engaged with mating interior threads in a tapped aperture 12 in the back-up member 6. It will be seen that the outer surface of the head 10 of the screw 2 is flat and, when the parts 4 and 6 are secured together, is disposed substantially flush with the outer surface of the element 4.

Extending coaxially through the screw 2 is a non-circular opening 16 adapted to receive an appropriate turning tool or wrench (not shown) of complementary exterior configuration. As shown in the drawing, the opening is substantially hexagonal for engagement by a hexagonal wrench. The opening 16 through the screw 2 is plugged by a metal plug or bar 18 of complementary exterior configuration. Preferably, the plug 18 is driven into the opening 16 in the screw 2 with a tight friction fit until the flat outer end of the bar is flush with the flat outer surface of the screw head 10.

It will be seen that because the opening 16 through the screw 2 is plugged by the bar 18 so that the flat outer end of the latter, together with the flat outer surface of the screw head 10, is flush with the outer surface of the plate-like element 4, there are no projections protruding beyond the latter surface to interfere with the movement of any material along such surface. Furthermore, the construction eliminates any depressions or recesses in the head 10 of the screw 2 after securement of parts thereby. Under extreme conditions of wear, such as is encountered by a liner plate for the chamber of a scrap metal baling press, metal of a screw head actually could become displaced into such recess or depression, thereby rendering extremely difficult, if not impossible, the reception in any such recess of a turning tool.

In the event, however, that the screw 2 needs to be withdrawn for replacement, for example, of the plate-like element 4, the bar or plug 18 can be pushed or drifted inwardly by an appropriate punch (not shown), as shown in FIGURE 5, to leave the outer portion of the opening 16 through the screw unplugged for reception of an appropriate turning tool. It also will be seen that should the screw 2 break at any point along its length, or even should the plate-like element 4 be completely worn away so that the screw head 10 likewise is completely worn away, the plug 18 can still be driven inwardly to an extent sufficient to enable the remaining outer portion of the opening 16 through the screw to be unplugged for the reception of a turning tool to unscrew any remaining part of the screw.

In the event that a tapped opening 20 in a back-up member 22 for the reception of the screw 2 does not extend completely through such member, i.e., is a socket as shown in FIGURE 5, the plug or bar 18 should be of considerably less length than that of the screw. With these proportions, it will be seen that even though the end of the shank 14 of the screw substantially abuts against the bottom of the tapped blind hole or aperture 20, the plug 18 can still be driven inwardly a distance sufficient to unplug an outer section of the opening 16 which extends through the screw; thus again permitting the screw 2 to be engaged by an appropriate turning tool. It further will be seen that the opening 16 need not extend completely through the screw 2 in all instances, but in such event the plug should be of less length than the opening.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:
1. An attachment comprising: an element having a flat outer surface portion and a counter-bored aperture in said surface; a backing member having a tapped aperture aligned with said counter-bored aperture; a screw extending through said counterbored aperture, threaded into said tapped aperture, and securing said element and member together, said screw having a shank and an enlarged flat head countersunk into said counterbored aperture flush with said outer surface portion, and further having a non-circular turning-tool-receivable coaxial opening of uniform cross-section throughout its length extending into said head and at least partly through said shank, the inner end of said shank being substantially inaccessible; and a plug complementary to and frictionally engaged with a drive fit within said opening and thereby retained in position in said opening against ordinary loads imposed thereon, said plug being of less length than said opening and having a flat outer end disposed flush with the flat outer surface of said screw head, whereby said plug can be driven further into said opening to expose an outer portion thereof for engagement by a turning tool to unscrew said screw.

2. An attachment comprising: an element having a flat outer surface portion and a counterbored aperture in said surface; a backing member having a tapped aperture aligned with said counterbored aperture; a screw extending through said counterbored aperture, threaded into said tapped aperture, and securing said element and member together, said screw having a shank and an enlarged flat head countersunk into said counterbored aperture flush with said outer surface portion, and further having a non-circular turning-tool-receivable coaxial opening of uniform cross-section throughout its length extending through said head and shank, the inner end of said shank being substantially inaccessible; and a plug complementary to and frictionally engaged with a drive fit within said opening and thereby retained in position in said opening against ordinary loads imposed thereon, said plug having a flat outer end disposed flush with the flat outer surface of said screw head, said outer end of said plug can be driven into said opening to exposed an outer portion thereof for engagement by a turning tool to unscrew said screw.

3. The attachment defined in claim 2 in which the plug is of less length than the opening through the screw and the tapped aperture is blind with the lower end of said screw adjacent the bottom of said aperture, whereby said plug can be driven further into said opening to expose an outer portion thereof for engagement by a turning tool to unscrew said screw.

References Cited in the file of this patent
UNITED STATES PATENTS

| | | |
|---|---|---|
| 337,961 | Kirby | Mar. 16, 1886 |
| 791,548 | Fischer | June 6, 1905 |
| 857,295 | Mudge | June 18, 1907 |
| 1,271,408 | Wood | July 2, 1918 |
| 1,581,096 | Barnes | Apr. 20, 1926 |
| 2,133,409 | Webb | Oct. 18, 1938 |

FOREIGN PATENTS

| | | |
|---|---|---|
| 18,010 of 1896 | Great Britain | Aug. 14, 1896 |